United States Patent
Muhonen (10) Patent No.: US 7,127,246 B1
(45) Date of Patent: Oct. 24, 2006

(54) DATABASE MANAGEMENT (75) Inventor: Ahti Muhonen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/048,390

(22) PCT Filed: Aug. 25, 1999

(86) PCT No.: PCT/EP99/06238

§ 371 (c)(1),
(2), (4) Date: May 23, 2002

(87) PCT Pub. No.: WO01/15478

PCT Pub. Date: Mar. 1, 2001

(51) Int. Cl.
*H04Q 7/20* (2006.01)

(52) U.S. Cl. ............... 455/433; 455/432.1; 455/432.3; 455/435.1

(58) Field of Classification Search ............ 455/433, 455/432.1, 432.3, 435.1, 435.3
See application file for complete search history.

(56) References Cited

U.S. PATENT DOCUMENTS

| | | | | |
|---|---|---|---|---|
| 5,123,111 | A |  | 6/1992 | Delory et al. ............ 455/34.1 |
| 5,408,683 | A |  | 4/1995 | Ablay et al. ............. 455/33.1 |
| 6,108,537 | A | * | 8/2000 | Comer et al. ........... 455/426.1 |
| 6,731,932 | B1 | * | 5/2004 | Rune et al. ............. 455/432.1 |
| 6,738,647 | B1 | * | 5/2004 | Link, II .................. 455/564 |

FOREIGN PATENT DOCUMENTS

| | | |
|---|---|---|
| GB | 2328119 A | 2/1999 |
| WO | WO 98/15133 | 4/1998 |
| WO | WO 98/47305 | 10/1998 |

OTHER PUBLICATIONS

Digital cellular telecommunications system (Phase 2); Organization of subscriber data, European Telecommunication Standard, ETS 300 526, Oct. 1996, Second Edition, 20 pages.
The Network Switching Subsystem, GSM Networks: Protocols, Terminology, and Implementation, pp. 31 to 38, 1999.
Digital Cellular Telecommunications System (Phase 2); Organization of Subscriber Data, European Telecommunications Standard, ETS 300 526, Oct. 1996, Second Edition, 20 Pages.
The Network Switching Subsystem, GSM Networks: Protocols, Terminology, and Implementation, pp. 31 to 38, 1999, no month.
Tdoc N2-99679, Draft Technical Report: Super-Charger, 3GPP TSG-CN WorkGroup 2, Edinburgh, U.K., May 17-21, 1999.

* cited by examiner

*Primary Examiner*—Lester G. Kincaid
*Assistant Examiner*—Phuoc Doan
(74) *Attorney, Agent, or Firm*—Cohen, Pontani, Lieberman & Pavane

(57) ABSTRACT

The present invention proposes a method for management of a database of a visitor location register in a telecommunication network, wherein said database has a predetermined storage capacity and is adapted to contain a plurality of data sets, each data set containing subscriber data associated to an individual subscriber of said telecommunication network or of another telecommunication network, said individual subscribers having at least once registered within a geographical area of said telecommunication network corresponding to said visitor location register (VLR), said method comprising the step of: selecting (S24) subscriber data of said database to be deleted from said database, wherein said selection being based on parts of said subscriber data on the basis of which a roaming behavior of the associated subscriber can be determined. Also, the present invention proposes accordingly adapted VLR and HLR devices.

25 Claims, 6 Drawing Sheets

DATABASE MANAGEMENT

PRIORITY CLAIM

This is a national stage of PCT application No. PCT/EP99/06238, filed on Aug. 25, 1999. Priority is claimed on that application.

FIELD OF THE INVENTION

The present invention relates to a method for management of a database of a visitor location register in a telecommunication network.

In particular, the present invention relates to such a method in connection with a feature commonly referred to in the Third Generation Partnership Project (3GPP) developing the UMTS network (Universal Mobile Telecommunication System) as Super Charger.

BACKGROUND OF THE INVENTION

Generally, in telecommunication networks, data concerning the subscribers using the services are permanently stored in a home location register HLR of a respective user.

Note that throughout the following specification, following the definition as given in GSM 03.08, Version 4.8.0, page 9, the term user data will be used to designate all information associated with a subscription which is required for service provisions, identification, authentication, routing, call handling, charging, subscriber tracing, operation and maintenance purposes. Some subscriber data are referred to as permanent subscriber data, i.e. they can only be changed by administration means. Other subscriber data are referred to as temporary subscriber data which may change as a result of normal operation of the system.

Each subscriber is assigned to a specific HLR of the network he has subscribed to, i.e. the network (PLMN) operated by his network operator with whom he has a service contract. Note that each PLMN network has at least one HLR, depending on the number of actual subscribers to the network.

However, the HLR as a database represents too slow a storage means in terms of access times for the management of the subscriber data upon, e.g. a call connection request.

Therefore, visitor location registers VLR for a dynamic subscriber data management were introduced. In VLR's, a copy of at least part of the subscriber data for a respective subscriber is included. Moreover, a respective VLR is associated with a corresponding geographical area of the telecommunication network PLMN it belongs to. Hence, only those subscriber data are present in the VLR which correspond to the subscribers presently present in the geographical area of the VLR.

Among the subscriber data which could be considered most important, the following are for example contained in both, the HLR as well as the VLR:
1) Subscriber specific data:
  IMSI (International Mobile Subscriber Identity), TMSI (Temporary Mobile Subscriber Identity), Supplementary Services indication parameters available for the subscriber, and a basic MSISDN (Mobile Station ISDN number, i.e. the basic telephone number of the subscriber)
2) Authentication and Ciphering data:
  RAND/SRES/Kc parameters (up to five triplets of the parameters)
3) Subscriber location/Call forwarding parameters:
  MSC number (Mobile Services Switching Center), and LMSI (Local Mobile Station Identity).

For a more detailed but still general introduction to the HLR/VLR interdependency it is referred to Gunnar Heine: "GSM Networks: Protocols, Terminology, and Implementation"; Chapter 4: "The Network Switching Subsystem"; pp. 31 to 35; Artech House Mobile Communications Library; Artech House Publishers, Boston, London; 1999.

Hitherto, in connection with subscriber data management at the HLR/VLR, every time a subscriber enters to a new geographical area associated to a different (i.e. "new") VLR and served by the new VLR and the MSC's associated thereto, the subscriber data were downloaded and/or transferred from the "old" VLR the geographical area of which has been left to the new VLR the geographical area of which has been entered. Also, there may arise situations, in which the subscriber data of the roaming/moving subscriber is not transferred from the old VLR, but has to be downloaded from the subscriber's home HLR (i.e. the HLR of the PLMN he has subscribed to). In the above cases, the subscriber data were deleted from the old VLR upon the subscriber having left the geographical area corresponding to the VLR.

Apparently, if the geographical areas associated with the VLR's are quite small, or the subscriber frequently moves "between different VLR's", the data transfer between respective VLR's and/or between the subscriber's HLR and the VLR's will represent a large signaling load. This holds for subscribers moving within their home network as well as for roaming subscribers (moving between different networks, particularly, between different international networks established in different countries), so that due to the large amount of necessary signaling, correspondingly high signaling costs will accrue.

Additionally, with a continuous growth of international traveling for business purposes and/or holidays, the number of roaming subscribers can be expected to increase significantly in the future, so that the above problem will become even more severe.

In consequence, an attempt referred to as Super Charger has been made to reduce the signaling load and the signaling costs inherent thereto. For the purposes of the present invention, the Super Charger feature is not set out in detail herein, but the interested reader is expected to be familiar with the Super charger feature.

That is, in this attempt it has been proposed to equip a network with the Super Charger feature (so-called Super-Charged Network) so that in such a Super-Charged network subscriber information is no longer deleted from the VLR databases when a mobile station leaves the geographical area associated with the respective VLR/MSC's it has registered to.

However, this will lead to a continuous growth of the size of the VLR database. In consequence, a VLR database, in order to handle and/or keep the large amount of subscriber data which are no longer deleted, could become as large as a HLR database. This, however, could lead to a drawback such that the access speed of the VLR database is no longer superior to the access speed of a HLR, so that the VLR could no longer fulfill its task of a quick dynamic subscriber data management for call control and/or mobility management purposes.

Therefore, some VLR database management functionality has to be provided for in order to prevent the necessity for provisioning a VLR database of excessive size.

In a most recent proposal made by NORTEL NETWORKS in the 3GPP TSG-CN Workgroup 2 meeting in Edingurgh, U.K., May 17–21, 1999, a basic database management method is proposed. Apart from the utilization of larger databases, a deletion of subscriber data, either in a periodic audit or in the course of a dynamic subscriber data deletion, is proposed. Such a deletion of subscriber data as proposed by NORTEL is, however, solely based on the age of the subscriber data, such that in either case the oldest data are removed first from the VLR database.

Such a VLR database management procedure, however, is not an optimum one.

SUMMARY OF THE INVENTION

Consequently, it is an object of the present invention to provide a method for management of a database of a visitor location register in a telecommunication network which is optimized as compared to the previous proposals.

According to the present invention, this object is achieved by a method for management of a database of a visitor location register in a telecommunication network, wherein said database has a predetermined storage capacity and is adapted to contain a plurality of data sets, each data set containing subscriber data associated to an individual subscriber of said telecommunication network or of another telecommunication network, said individual subscribers having at least once registered within a geographical area of said telecommunication network corresponding to said visitor location register, said method comprising the step of: selecting subscriber data of said database to be deleted from said database, wherein said selection being based on parts of said subscriber data on the basis of which a roaming behavior of the associated subscriber can be determined.

Also, according to the present invention this object is achieved by a visitor location register device for a telecommunication network, comprising a determination means for determining a roaming behavior of a subscriber having at least once registered to the visitor location register device; a selection means, being responsive to the determination result of said determination means, and adapted to select those subscriber data to be deleted from a memory means of said visitor location register device; a deletion means adapted to delete the selected subscriber data, and a decision means adapted to control said determination means and said deletion means, based on results of monitoring said memory means.

Still further, according to the present invention this object is achieved by a home location register device for a telecommunication network, comprising a memory means adapted to store a special information element associated with a respective subscriber, the information element indicating that the subscriber will be visiting at least one particular visitor location register frequently; and an addressing and determination means, adapted to address a data set of subscriber data in said memory means based on a request of a requesting VLR device for respective subscriber data, adapted to determine that a VLR number of said requesting VLR is contained in said special information element associated with said respective subscriber, and adapted to issue an indication to the requesting VLR, indicating that subscriber data of said respective subscriber are not to be deleted from a memory means of said VLR.

With the present invention being implemented in a telecommunication network, particularly a Super-Charged network, the operation of the Super Charger feature can be optimized. Moreover, due to selecting subscriber data to be deleted based on parts of said subscriber data on the basis of which a roaming behavior of the associated subscriber can be determined, specific groups of subscribers can be favored in that their subscriber data are not deleted or deleted at least after subscriber data of non-favored subscribers have been deleted. Such a selection can be made based on static subscriber data or on dynamic subscriber data such as data collected on a respective subscriber in a statistics.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

Still further objects, features and advantages of the present invention will become apparent when referring to the description of the accompanying figures, in which.

DETAILED DESCRIPTION OF PREFERRED EMBODIMENTS

The present invention will be described herein below in detail with reference to particular embodiments thereof illustrated in the drawings.

According to the present invention, in connection with the VLR database management, subscriber data of said database to be deleted is/are selected from said database, wherein said selection is based on parts of said subscriber data on the basis of which a roaming behavior of the associated subscriber can be determined. That is, in contrast to the previous approach, according to which subscriber data was deleted based on its age (i.e. time of being written into the database), the present invention enables a selection of data to be deleted based on a roaming behavior of individual subscribers.

Note that for the purposes of the present invention and the following description, a subscriber is said to roam under a VLR when he has registered to said VLR. Thus, "roaming" in the present specification does not only imply an inter-network roaming, but also an intra-network roaming. Stated in other words, a subscriber having (at least once) registered to a VLR and leaving the geographical area corresponding to said VLR is said to be a roaming subscriber, and the expression "roaming behavior" as used herein refers to the behavior of a subscriber to leave a VLR he has at least once registered to.

The roaming behavior may either be a predicted one (e.g. predictingly determined based on static subscriber data parameters) or a "verified" one (e.g. determined based on at least one collected statistical parameter for individual subscribers). Also, the roaming behavior may be determined upon a combination of the above two methods. Still further, the above ways for selecting the subscriber data to be deleted from the VLR database can be supplemented by referring to the size of the subscriber data as a supplementary selection criterion.

The above outlined principle will be explained now in more detail.

Firstly, it is to be noted that among the parameters kept in the VLR database for a respective user, there is the (static and subscriber specific) parameter IMSI (International Mobile Subscriber Identity). The IMSI parameter, in turn, is composed of MCC (Mobile Country Code, specifying a country or area, respectively), the MNC (Mobile Network Code, specifying a PLMN network, i.e. the subscribers "home" network within the country/area specified by the MCC), and the MSIN (Mobile Station Identification Number, which is not necessarily the mobile station's telephone number, i.e. MSIN can be unequal to the MSISDN).

Hence, the selection for subscriber data to be deleted can advantageously be based on the IMSI parameter of a respective subscriber. That is, the selection of the subscriber data to be deleted can be based on the MCC part of the IMSI, it can be based on the MNC part of the IMSI, or it can be based on the MCC part in combination with the MNC part of the IMSI. The IMSI parameter and its parts MCC, MNC can be used to predict the roaming behavior of a respective user.

Namely, consider an example scenario of a VLR database to be managed within a PLMN network in Luxembourg (LU). As commonly known, Luxembourg being located in the middle of Europe is surrounded by at least The Netherlands (NL), Belgium (BE), France (FR), and Germany (DE). Farther away from Luxembourg there are, still within Europe, Great Britain (GB), Denmark (DK), Spain (ES), Italy (IT). Still further away are, outside Europe, Australia (AU), Japan (JP) and the United States (US), for example.

Now, each user roaming within the geographical area associated with the subject VLR database of interest in Luxembourg can be identified by his IMSI. From the MCC part of the IMSI of each subscriber it can be concluded to his origin, i.e. his home country. Thus, it could be expected (assumed) that subscribers from the European countries immediately surrounding Luxembourg such as NL, BE, FR, DE may more frequently roam to the subject VLR, while subscribers from other European countries such as ES, IT could be expected to roam less often to the subject VLR. Still further, subscribers from foreign countries in other continents such as AU, JP, US could be expected to be the least frequent roaming subscribers roaming to the subject VLR.

Therefore, based on the IMSI, i.e. the MCC part thereof, a roaming behavior of the associated subscriber can be determined. Hence, in the above illustrated scenario, for example, subscriber data of Japanese, U.S., or Australian subscribers could be deleted first as one can predict that they will be roaming to the subject VLR rather seldom. That is, subscribers having as MCC a mobile country code identifying them as members of a predetermined group of MCC's, e.g. as "Europeans" can be preferred and their data will not be selected for being deleted from the VLR database.

Still further, as mentioned further above, the selection could additionally or alternatively be based on the MNC part of the IMSI.

In this connection, assume that the operator of the PLMN the subject VLR database forms a part of has a special contract or agreement with an operator of another PLMN, either in the same country, same continent or in other continents.

In such a case, subscribers having subscribed to the subject PLMN network or to the another PLMN network the subject operator has a contract with, could be preferred as compared to other subscribers. That is, the subscriber data of subscribers which are identified by a MNC forming part of a predetermined group of MNC's will not be selected for being deleted from the VLR database.

Note that although herein above the method has been described in a way such that members of predetermined groups (MCC groups and/or MNC groups) are preferred (i.e. their subscriber data being not selected for being deleted), it is also possible to adapt the present method such that members are not preferred so that their data will be selected for being deleted and non-members will be preferred. However, the specific choice will depend on the specific circumstances of application of the method according to the presented invention.

Moreover, as an alternative or an addition to the above outlined selection methods, statistical parameters such as the frequency of presence of a subscriber in the subject VLR area could be evaluated in order to determine a roaming behavior of the associated subscriber.

With reference to the above example, assume that the subscriber data of an Australian subscriber frequently roaming to Luxembourg for business reasons would be selected for being deleted, since the subscriber would be determined as a "non-roaming" or at least "non-frequent roaming" subscriber due to the check of his MCC not belonging to the predetermined group of MCC's (e.g. the European MCC's).

However, if (in the present example in addition) it is checked whether the subscriber is frequently present in the subject VLR area, (e.g. at least twice per month), then the method can be adapted such that his subscriber data will not be selected for being deleted even if his MCC does not belong to a predetermined country code (and/or MNC).

Additionally, the final decision as to whether subscriber data are to be deleted from the VLR database can be made dependent on the size of the subscriber data (which have been pre-selected according to the above outlined methods). In this connection, the size criterion can advantageously be based on the number of sets of the authentication and ciphering data (RAND/SRES/Kc parameters (up to five triplets of the parameters)) stored in the VLR database for a respective subscriber. That is, the method can be adapted such that the actual size of the subscriber data (e.g. the number of stored triplets of authentication data) is compared with a predetermined size threshold value.

Then, it is possible to select those data having a size bigger than the threshold size value for being deleted. This will free more space in the VLR database. However, in case of the data being required to be transferred to the VLR again from the HLR, this will imply a correspondingly increased signaling amount.

Therefore, it is also possible to select those data having a size smaller than the threshold size value for being deleted. This will free less space in the VLR database. However, in case of the data being required to be transferred to the VLR again from the HLR, this will imply a correspondingly reduced signaling amount.

The choice whether the smaller or bigger data sets of subscriber data are to be selected for being deleted will again depend on the specific application case.

So far, the principle underlying the present invention has been described with reference to specific subscriber data contained in the VLR and/or statistical (history) parameters of respective subscribers collected in the VLR. However, the described examples are merely given for explanatory purposes and other subscriber data parameters included in the VLR could be used for the purposes of the present invention, as long as they are suitable for a determination of the roaming behavior of a particular subscriber roaming under a subject VLR to be managed.

The present invention will now be described with reference to the drawings which illustrate a respective particular implementation of the method according to the present invention as described above.

Figure 1:
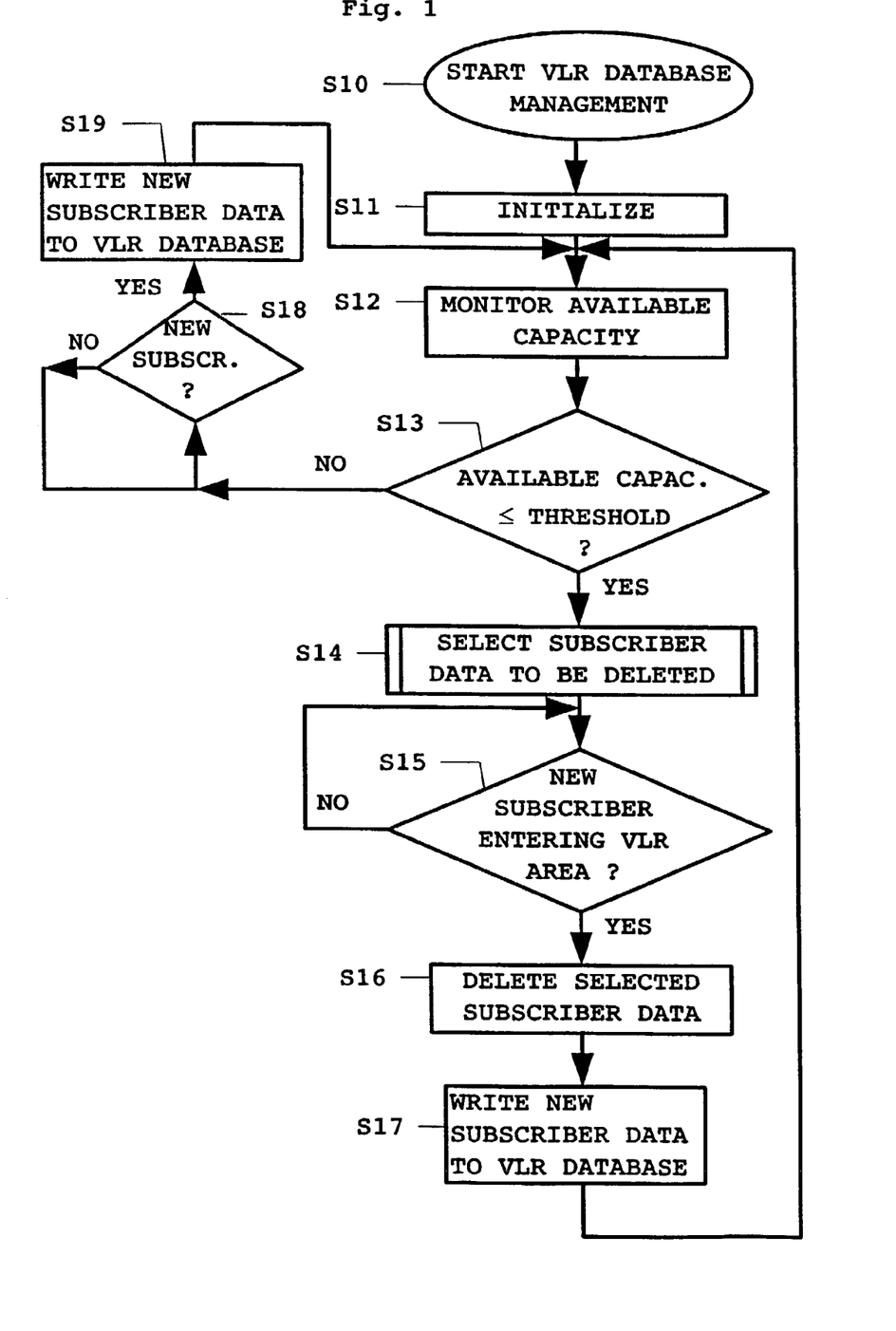
FIG. 1 illustrates a flowchart of the overall method for management of a database of a visitor location register in a telecommunication network according to the present invention.

FIG. 1 illustrates a flowchart of the overall method for management of a database of a visitor location register VLR in a telecommunication network such as the UMTS network according to the present invention.

The method for VLR database management starts in step S10.

In a subsequent step S11, an initialization is performed. That is, if the VLR database capacity is configurable, the database capacity (storage capacity for subscriber data) can be configured upon initialization. At least, (to be explained later in detail) an available database capacity threshold value, the selection criteria such as MCC and/or MNC parameters and/or predetermined MCC/MNC groups, as well as, if desired, a predetermined frequency as a frequency of occurrence threshold value, and still further, optionally, a predetermined size as a subscriber data size threshold value are set upon initialization.

Then, in step S12, the available VLR database capacity (available and/or empty storage capacity) for subscriber data is monitored.

Thereafter, in step S13, the monitored available capacity is compared with the available capacity threshold value set upon initialization. For example, the capacity threshold value could be set to a value of 5% of the overall database capacity, so that a sufficient number of new subscribers entering the geographical area corresponding to the subject VLR can be registered immediately in the VLR database without problem and/or without deleting data to free database storage space.

If it is decided in step S13 that the available capacity is not equal to or not below the capacity threshold (NO in step S13), the flow proceeds to step S18.

In step S18 it is detected, whether a new subscriber enters said geographical area of said telecommunication network corresponding to said visitor location register to be registered thereto. If NO, the flow loops to step S18 until a new subscriber enters (YES) and the subscriber data thereof are, step S19, subsequently written to the VLR database. Thereafter, the flow returns to step S12.

If, however, the available database capacity is equal to or below the capacity threshold (NO in step S13), the flow advances to step S14. (If available database capacity is equal to or below the capacity threshold this means that the VLR database has presumably not enough memory space left for an immediate registration of new subscribers, so that memory space of the database has to be freed.)

In step S14, a selection procedure as a part of the overall method is called, to which procedure the main flow branches. This procedure of selection is described later with reference to FIGS. 2 to 4, respectively.

After the selection of subscriber data to be deleted has been carried out in step S14, based on parts of said subscriber data on the basis of which a roaming behavior of the associated subscriber can be determined, the flow proceeds to step S15.

As in step S18 described above, the flow loops in step S15 until a new subscriber (at least one subscriber) is entering the geographical area corresponding to the subject VLR.

If YES in step S15, i.e. a new subscriber is detected, the flow advances to step S16. In step S16, the previously selected subscriber data data sets for being deleted are deleted.

Thereafter, in step S17, the subscriber data data set(s) of the detected new subscriber(s) are written to the VLR database and the flow returns to step S12.

Figure 2:
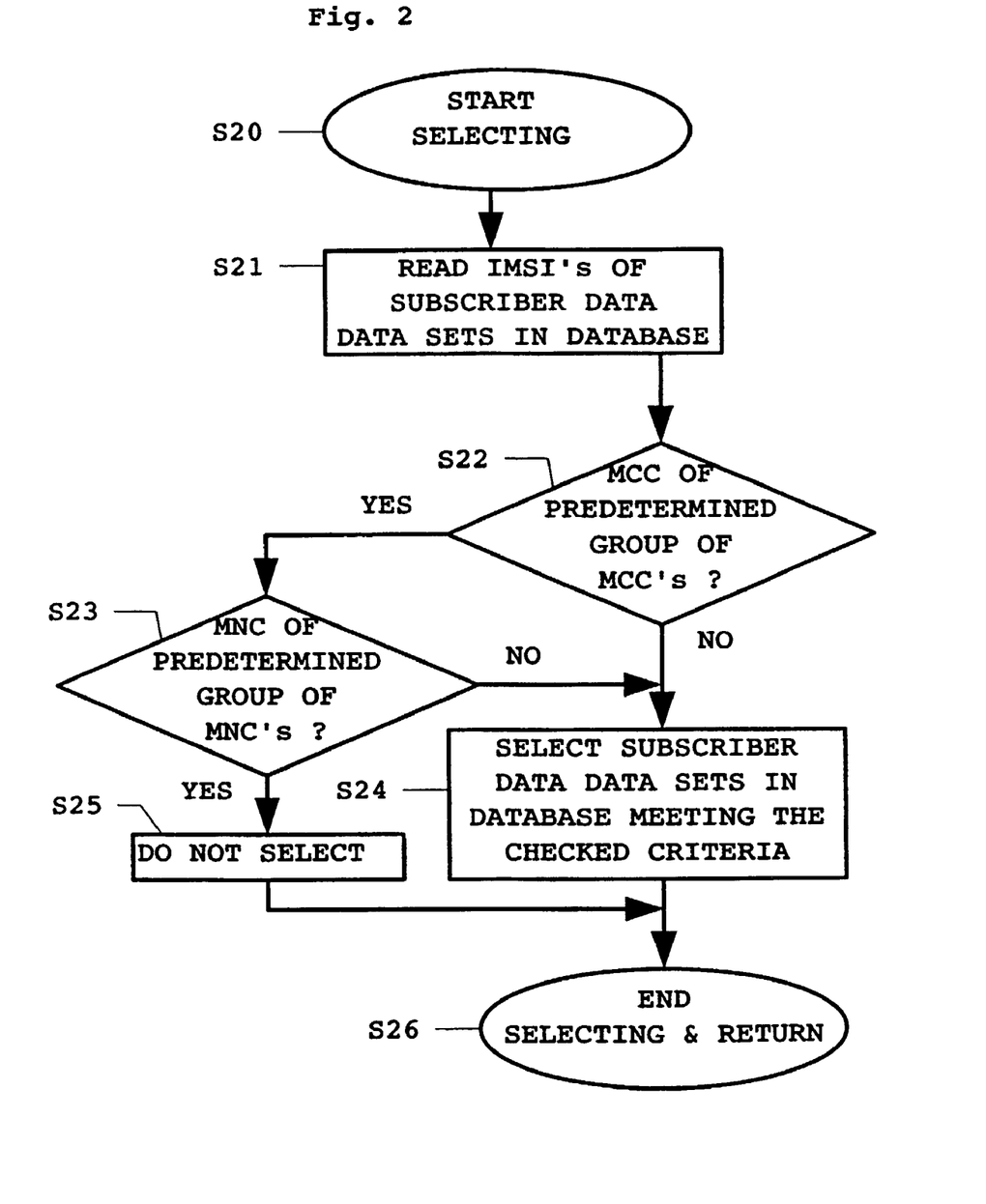
FIG. 2 shows a flowchart of a selection procedure for selecting subscriber data to be deleted from the VLR database according to an embodiment of the present invention.

FIG. 2 shows a flowchart of a selection procedure (step S14 in FIG. 1) for selecting subscriber data to be deleted from the VLR database according to an embodiment of the present invention.

The procedure starts in a step S20.

Subsequently, the IMSI of the subscriber data data sets contained in the VLR database is read, see step S21.

Thereafter, in step S22, it is checked whether a respective one of the MCC's of the IMSI's read in step S21 belongs to a predetermined group of MCC's. Referring to the above example, European MCC's could be determined as a predetermined group of MCC's.

If a respective MCC is not of the predetermined group (NO in step S22) the flow advances to step S24.

In step S24, the corresponding subscriber data data sets containing an IMSI having an MCC being not of the predetermined group of MCC's are selected for being deleted, and the procedure advances to step S26, where it ends and returns to the main flow shown in FIG. 1.

As a modification (not shown in FIG. 2), after the result of the check in step S22 yields NO, an additional check based on MNC's (explained further above) could be performed.

Such a check based on MNC's is now explained below in connection with the YES branch of step S22. That is, if its determined in step S22, that respective subscribers belong to the predetermined group of MCC's, a subsequent step S23 performs a check to determine, whether among the subscribers belonging to the predetermined group of MCC's, there are subscribers belonging to a predetermined group of MNC's. Then, those subscribers not belonging to the predetermined group of MNC's (NO in step S23) are additionally selected for being deleted in step S24, while those subscriber data of subscribers belonging to the predetermined MCC group and the predetermined MNC group are not selected (step S25) for being deleted.

After step S25, the procedure comes to step S26 where it ends end returns to the main flow of FIG. 1.

It is to be noted that the check for MCC (step S22) could be the only check in a selection procedure, while however, the example in FIG. 2 illustrates a case in which the MCC check is supplemented by an MNC check (step S23). The MNC check can be performed dependent on the result of a preceding MCC check, or as mentioned earlier in connection with the modification (not shown in FIG. 2), it can be performed for each result of the MCC check.

Still further, the description focused on an example, in which subscriber data data sets have been checked only for the membership to one respective group of MCC and/or MNC. Nevertheless, in a still further modification (not shown), a check may be performed stepwise. With reference to the example above, in connection with a stepwise MCC check, in a first stage it could be checked whether a subscriber is a member of European states, in a second step it could be checked whether, if a European state member, the subscriber is a member of direct neighboring states of the state where the subject VLR is located. In this way, a determination of the roaming behavior could be made in a more precise manner since non-Europeans will roam less then those Europeans which are not directly neighboring a country in which a subject VLR is located, which ones in turn will roam less than subscribers of European countries of direct neighboring countries to the country in which a subject VLR is located. Thus, to this end, at least first, second, . . . , or, generally, $1^{st}$ to n-th predetermined groups of MCC'S/MNC's have to be defined in an initialization step.

Also, a single stage MCC check can be combined with a multi-stage MNC check and vice versa, in any of the above mentioned combinations, if desired, as long as the roaming behavior of a subscriber can be determined or estimated based on the thus performed evaluation of parameters.

Figure 3:
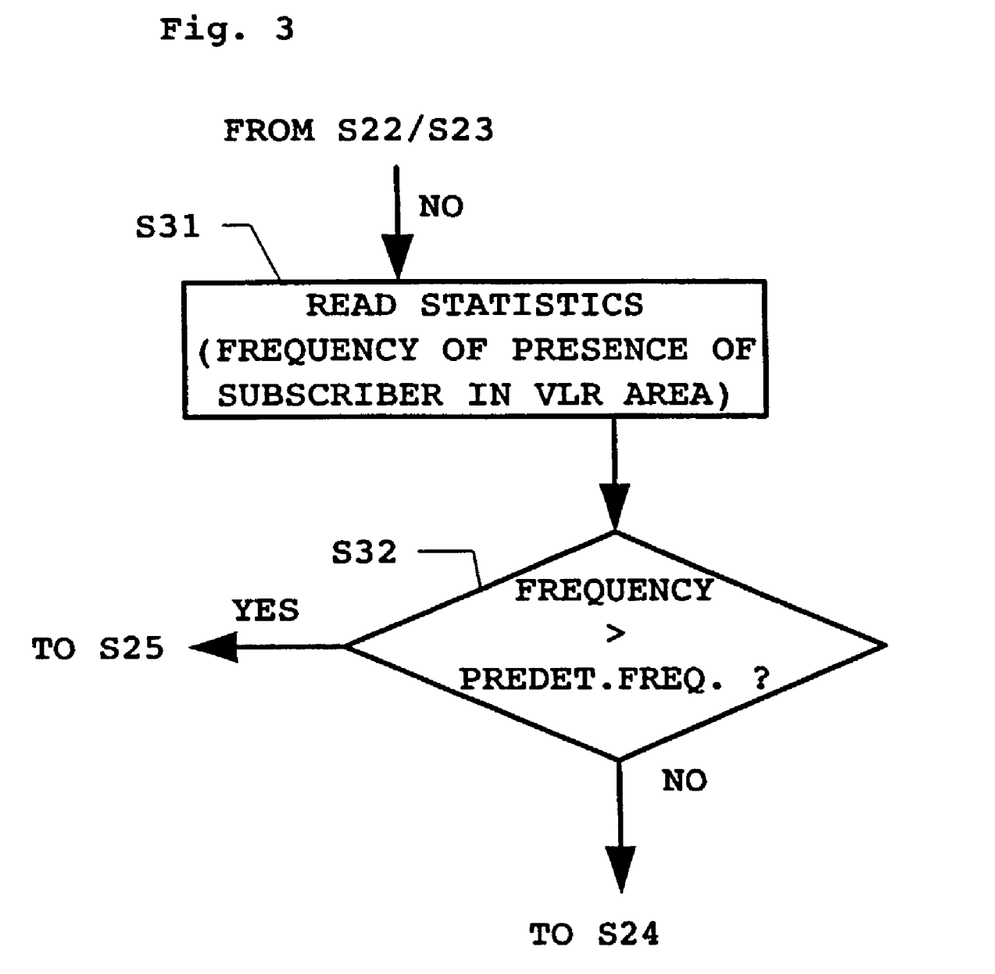
FIG. 3 depicts a flowchart of a modification to the embodiment of the present invention.

FIG. 3 depicts a flowchart of a modification to the embodiment of the present invention as shown in FIG. 2 and applicable to its above briefly mentioned modifications. Also, the selection scheme as shown in FIG. 3 could be applied as a sole selection criterion.

Nevertheless, for the purpose of explanation of the invention, it is assumed that the steps S31, S32 of FIG. 3 are inserted in the procedure shown in FIG. 2 after the steps S22/S23 and the result branch NO thereof. It is, however, to be understood that this selection scheme could also be applied in the YES branch of preceding selection decisions (preselections).

In step S31, the accumulated statistics concerning the respective subscribers and being maintained in the VLR database are read. That is, as a statistical parameter describing the roaming/moving behavior of a subscriber under the VLR he/she has registered to, his or her frequency of presence in the subject VLR geographical area is maintained in the VLR and read out.

Thereafter, in step S32, for a respective subscriber it is determined whether his frequency is above a predetermined frequency of occurrence, i.e. whether he is a "frequent roamer" (for example a business man) or not (for example at least two times per month, or the like). If YES, this signifies that the corresponding subscriber data will frequently be used by the subject VLR database and are not to be deleted, so that the flow, from S32, advances via step S25 to step S26 in FIG. 2.

If, however, the decision in step S32 is negative (NO), the procedure advances to step S24, and the data of the respective subscribers are selected for being deleted, since the subscribers are presumably "non-frequent roamers" such as tourists, the data of which will presumably not have to be used in the near future.

Figure 4:
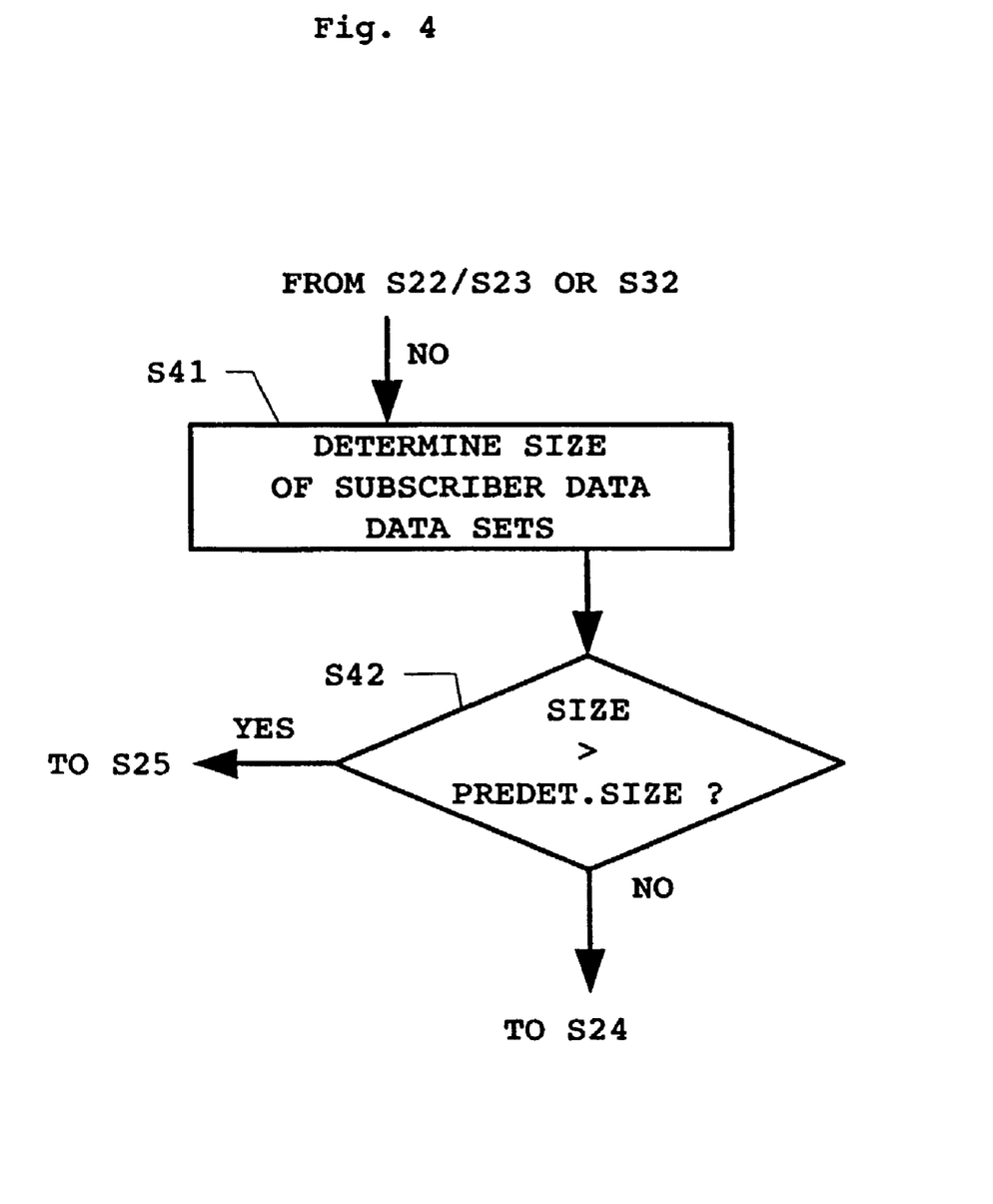
FIG. 4 depicts a still further modification of the selection procedure to be applied to the embodiment alone or in combination with the modification shown in FIG. 3.

FIG. 4 depicts a still further modification of the selection procedure to be applied to the embodiment of FIG. 2 (and its unshown modifications) alone or in combination with the modification shown in FIG. 3.

The additional steps shown in FIG. 4 are inserted after steps S22/S23 when applied in combination with the FIG. 2 procedure, or after step S32 when applied in combination with the FIG. 3 modification (whether the FIG. 3 modification is employed alone or again in combination with FIG. 2). Also, the FIG. 4 flow steps need not be applied after the NO branch of a previous decision, but can also be applied in a YES branch, depending on the application case and need.

In step S41, the size of subscriber data data sets is determined. A suitable approach for size determination can be based on the determination of how many authentication data triplets consisting of the RAND (Random Number), SRES (Signed Response) and Kc (Ciphering Key) are stored in a subject VLR database for a respective subscriber, since this may most significantly influence the size of stored subscriber data.

In the following step S42, the read and/or determined size is compared with a predetermined size threshold value. If the size is greater than the predetermined size (YES) the flow proceeds to step S25 (the data sets are not selected), otherwise, the flow proceeds to step S24 (the data sets are selected for being deleted).

In the illustrated case of FIG. 4, those data having a size smaller than the threshold size value are selected for being deleted. This will free less space in the VLR database.

Nevertheless, as mentioned earlier in the specification, also an inverse selection (not shown) could be performed such that those data having a size bigger than the threshold size value are selected for being deleted. This will free more space in the VLR database.

According to a still further conceivable embodiment, the selection can be based on a special information element associated with a respective subscriber, the information element indicating that the subscriber will be visiting at least one particular visitor location register frequently. Stated in other words, this information element also indicates that subscriber data of a specific subscriber are not to be deleted from the database of at least one particular visitor location register. This special information element associated with a respective subscriber can preferably be entered by a network operator, and is stored in the home location register (HLR) of the respective subscriber. Also, it is conceivable that a subscriber himself may configure this special information element and specify those VLR's from which he does not wish to have his data deleted as he visits the geographical areas associated thereto quite frequently.

This will be set out in greater detail herein below.

Namely, according to this embodiment, a special information element is defined for a respective subscriber. This special information element consists a list of VLR's which are (presumably) frequently visited by the respective subscriber. Also, this list is permanently kept (stored) at the HLR of the respective subscriber.

Now, assume a case in which a subscriber roams to a VLR to which he has not registered before. Then, when registering to the VLR, the VLR requests the subscriber's HLR to forward the subscriber data of the subscriber willing to register. Together with this request, the VLR submits its own identity to the HLR, i.e. the VLR number.

At the HLR side it is then determined whether the forwarded VLR number of the requesting VLR forms part of the special information element, i.e. whether the VLR number of the requesting VLR is contained in the list.

If so, the HLR returns the subscriber data together with an indication that the visited VLR belongs to the list. If not, only subscriber data are returned to the requesting VLR.

The method according to the present embodiment of the invention can thus be adapted such that the indication of the visited VLR belonging to the VLR's contained in the list, which list is prestored for the subscriber in its HLR, will lead to the subscriber data being not deleted from the VLR's database, when the subscriber roams out of the geographical area associated to the VLR. Stated in other words, the selection of the subscriber data to be deleted relies on a comparison whether the indication (e.g. a flag) has been transferred (set) for a respective subscriber at the VLR side.

Of course, this selection concept based on the special information element could suitably be combined with those mentioned earlier herein above, depending on the need to do so.

Herein before, the present invention has mainly been described with a focus on the method. However, the present invention also proposes accordingly adapted devices such as a VLR device and a HLR device, as will be explained in the following.

Figure 5:
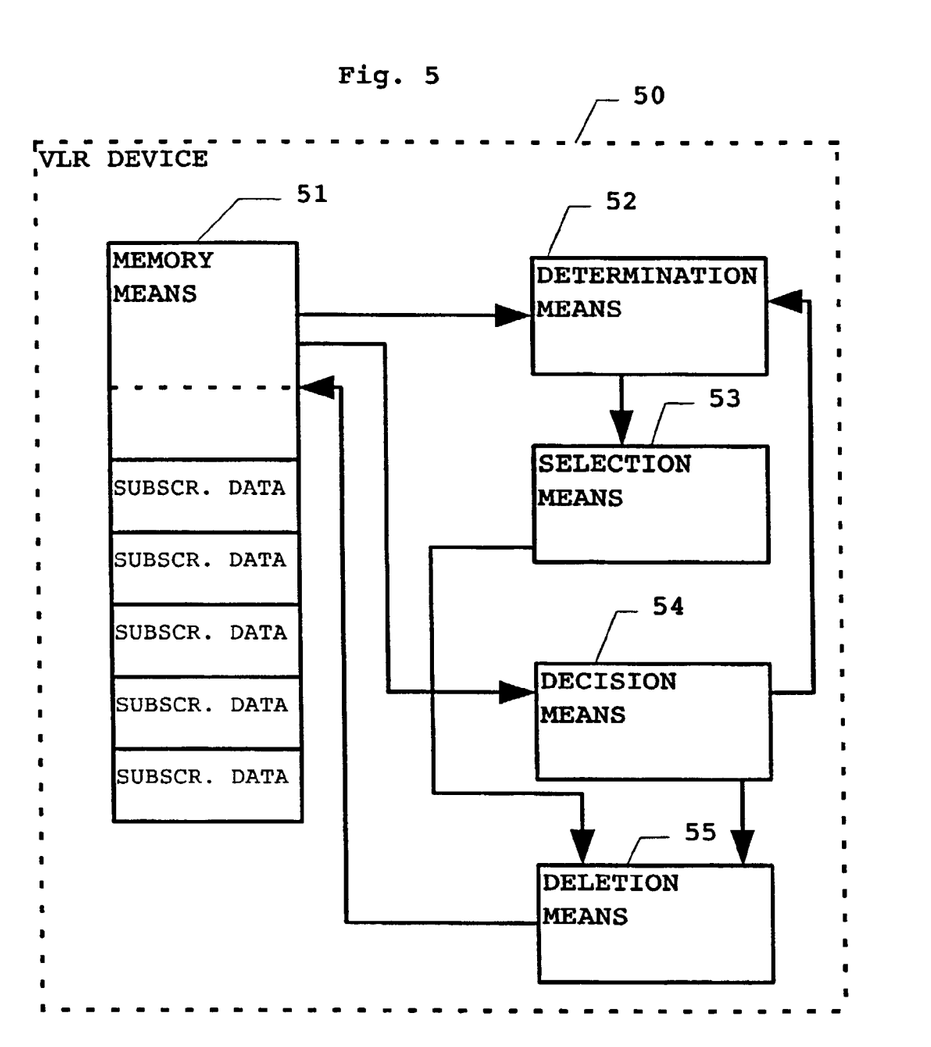
FIG. 5 schematically illustrates a block circuit diagram of a VLR device according to the present invention.

FIG. 5 shows schematically a block circuit diagram of a VLR device according to the present invention. Such a VLR device 50 comprises a memory means 51 containing a plurality subscriber data data sets of subscribers having at least once registered to said VLR and said to be roaming under said VLR. The memory means 51 with the subscriber data being stored therein constitutes a database of the VLR device.

Still further, the VLR device 50 comprises a determination means 52, a selection means 52, a decision means 54, and a deletion means 55. Of course, the VLR device may comprise further means, which further means, however, are not shown as they are not of particular interest in connection with the present invention.

The decision means 54 monitors the memory means 51 and based on the monitoring result supplied thereto decides, whether the above described method has to be carried out. Stated in other words, the decision means is adapted to perform an operation corresponding to step S13 in FIG. 1, and decides, whether an available storage capacity of said memory means 51 is less or equal to a predetermined capacity threshold value.

If so, the decision means outputs a corresponding trigger signal and supplies this trigger signal to the determination means 52. The determination means 52 in response thereto reads the subscriber data and determines, which of the subscriber data within the memory means 51 are suitable for being deleted, i.e. which one's of the data sets meet the selection criteria. The respective determination result is supplied to the selection means 53 which selects the determined data sets. The determination means 52 and the selection means 53 are adapted to perform an operation as described in connection with step S14 in FIG. 1, and FIGS. 2 to 4 including all described possible modifications of the selection scheme. Also, the determination and selection can be based on the still further conceivable embodiment as described above, according to which the selection is based on the special information element in the HLR.

Upon selection of the data sets to be deleted by the selection means 53, the selection means informs the deletion means 55 of the data sets selected to be deleted. This information may be in the form of the storage addresses of the respective subscriber data in the memory means 51.

The deletion means 55 is responsive to a triggering signal supplied thereto from the decision means 54. That is, the decision means 54 monitoring the memory means 51 is also adapted to perform a processing as described in connection with step S15 in FIG. 1. Then, upon a new subscriber entering the VLR area (registering to the VLR) (YES instep S15 in FIG. 1), the deletion means 55 is triggered to delete the previously selected data sets. To this end, the deletion means 55 accesses the memory means 51 and erases the selected data sets to free space in the memory means for new data. However, instead of erasing data and subsequently writing the new data to the memory, also an overwriting of the selected data by the new data is possible, and in terms of an increased processing speed also to be preferred.

Figure 6:
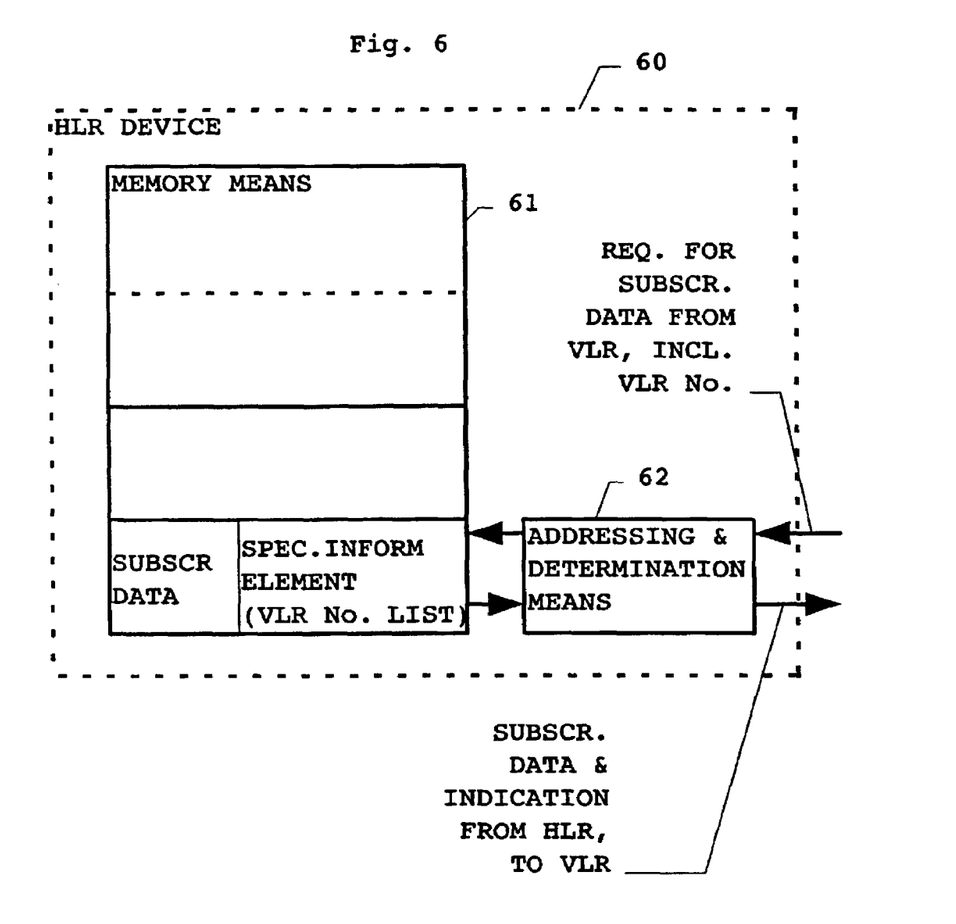
FIG. 6 schematically illustrates a block circuit diagram of a HLR device according to an embodiment of the present invention.

FIG. 6 schematically illustrates a block circuit diagram of a HLR device according to an embodiment of the present invention.

As shown in FIG. 6, the HLR device 60 comprises a memory means 61 containing a plurality of subscriber data data sets. Each data set (only one thereof is illustrated in greater detail) comprises "normal" subscriber data for a respective subscriber, and in addition, includes a special information element. The special information element, as described herein before in connection with the still further conceivable embodiment, represents a list of VLR's (identified by their VLR numbers), which the respective subscriber prefers to visit frequently. That is, the HLR device is adapted to store a list of VLR numbers for each subscriber (e.g. entered by the network operator) to which VLR's the subscriber frequently roams.

Furthermore, the HLR device comprises an addressing and determination means 62, which interacts with the memory means 61 and a corresponding VLR (not shown in FIG. 6) requesting subscriber data of a particular subscriber from the HLR.

That is, upon a subscriber registering (or trying to register) to a new VLR he has not registered to, the subject VLR issues a request for subscriber data to the subscriber's HLR. This request includes the requesting VLR's VLR number and is forwarded via an interface (so called D-interface, not shown) to the HLR device. More particularly, the request is being received at the HLR device side by the addressing and determination means. The addressing and determination means 62, based on a subscriber identity, addresses the data set corresponding to the subscriber requesting to register to the VLR. The associated subscriber data are read out from the memory means 61 and transferred to the addressing an determination means. In addition, also the special information element (i.e. the list of VLR numbers) associated to a respective subscriber is read out and supplied to the addressing and determination means. The determination part of the addressing and determination means 62 then compares the VLR number included in the received request (from the requesting VLR) with the VLR numbers contained in the special information element. If there is a match between the requesting VLR number and a VLR number contained in said VLR number list, the determination means generates an indication, which is forwarded to the requesting VLR together with the "normal" subscriber data. (Note that the above term "together" does not necessarily mean a transmission of the indication and the subscriber data in parallel, but the information may also be transmitted sequentially from the HLR to the VLR.)

The indication transmitted to the VLR will lead to the subscriber data being not deleted from the VLR's database, when the subscriber roams out of the geographical area associated to the VLR. Stated in other words, the selection of the subscriber data to be deleted from the VLR relies on a comparison whether the indication (e.g. a flag) has been transferred (set) for a respective subscriber at the VLR side.

Accordingly, as has been described herein above, in contrast to prior art approaches according to which subscriber data in a VLR database were deleted according to their age, according to the present invention other criteria for selecting data to be deleted from a VLR database are applied. Namely, the VLR database management is proposed to be based on the identity of a respective user, i.e. his/her IMSI (namely, the MCC and/or the MNC), thereby determining/predicting a roaming behavior of a subscriber. Also, it is proposed to base the database management on collected statistics for a respective user such as the frequency of occurrence/presence within the geographical area associated to a subject VLR the database of which is to be managed. Thereby, frequent visitors/roamers could be preferred in that their data is not deleted before the data of less frequent roamers is deleted from the VLR database. Thus, on the basis of the proposed method for management of a database of a visitor location register in a telecommunication network, particularly the operation of the Super Charger feature currently being investigated in by 3GPP workgroups can be optimized. However, the proposed method is of course not restricted to the specific Super Charger feature but can be applied in various other cases of VLR database management.

The present invention proposes a method for management of a database of a visitor location register in a telecommunication network, wherein said database has a predetermined storage capacity and is adapted to contain a plurality of data sets, each data set containing subscriber data associated to an individual subscriber of said telecommunication network or of another telecommunication network, said individual subscribers having at least once registered within a geographical area of said telecommunication network corresponding to said visitor location register, said method comprising the step of: selecting S14; S24 subscriber data of said database to be deleted from said database, wherein said selection being based on parts of said subscriber data on the basis of which a roaming behavior of the associated subscriber can be determined. Also, the present invention proposes accordingly adapted VLR and HLR devices.

It should be understood that the above description and accompanying figures are merely intended to illustrate the present invention by way of example only. The preferred embodiments of the present invention may thus vary within the scope of the attached claims.

Thus, while there have been shown and described and pointed out fundamental novel features of the present invention as applied to preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for management of a database of a visitor location register in a telecommunication network, said database having a predetermined storage capacity and being adapted to contain a plurality of data sets, each data set containing subscriber data associated with an individual subscriber of said telecommunication network or with another telecommunication network, said individual subscribers having at least once registered within a geographical area of said telecommunication network corresponding to said visitor location register, said method comprising the steps of:
   selecting subscriber data of said database to be deleted from said database,
   monitoring an available storage capacity of said predetermined storage capacity of said database, and
   deciding whether said available storage capacity is below a predetermined threshold value of available capacity;
   wherein said selection is based on portions of said subscriber data upon which a roaming behavior of an associated subscriber can be determined and based on a frequency of presence of a respective subscriber within said geographical area of said telecommunication network corresponding to said visitor location register, and wherein said selecting step is performed if said available storage capacity is below said predetermined threshold value.

2. The method of claim 1, further comprising the steps of:
   detecting that a new subscriber enters said geographical area of said telecommunication network corresponding to said visitor location register; and
   deleting the selected subscriber data; and
   writing a new data set of corresponding new subscriber data into said database.

3. The method of claim 1, wherein said selection is based on an International Mobile Subscriber Identity (IMSI) of a respective subscriber.

4. The method of claim 3, wherein said selection is based on a Mobil Country Code (MCC) contained in the IMSI.

5. The method of claim 4, wherein said selection is based on a Mobile Network Code (MNC) contained in the IMSI.

6. The method of claim 5, wherein said selection is based on a Mobile Network Code (MNC) contained in an International Mobile Subscriber Identity (IMSI).

7. The method of claim 5, wherein said selection is additionally based on a size of a respective data set of subscriber data.

8. The method of claim 4, wherein said selection is additionally based on a size of a respective data set of subscriber data.

9. The method of claim 3, wherein said selection is based on a Mobile Network Code (MNC) contained in the IMSI.

10. The method of claim 9, wherein said selection is additionally based on a size of a respective data set of subscriber data.

11. The method of claim 3, wherein said selection is additionally based on a size of a respective data set of subscriber data.

12. The method of claim 3, wherein a size of a respective data set of subscriber data is mainly determined by a number of triplets of RAND/SRES/$K_c$ authentication data sets stored for a respective subscriber within a subscriber data set in said database.

13. The method of claim 1, wherein said selection is additionally based on a size of a respective data set of subscriber data.

14. The method of claim 13, wherein the size is at least partially determined by a number of triplets of RAND/SRES/$K_c$ authentication data sets stored for a respective subscriber within a subscriber data data set in said database.

15. A method for management of a database of a visitor location register in a telecommunication network, said database having a predetermined storage capacity and being adapted to contain a plurality of data sets, each data set containing subscriber data associated with an individual subscriber of said telecommunication network or with another telecommunication network, said individual subscribers having at least once registered within a geographical area of said telecommunication network corresponding to said visitor location register, said method comprising the steps of:
   selecting subscriber data of said database to be deleted from said database,
   monitoring an available storage capacity of said predetermined storage capacity of said database; and
   deciding whether said available storage capacity is below a predetermined threshold value of available capacity;
   wherein said selection is based on portions of said subscriber data upon which a roaming behavior of an associated subscriber can be determined and based on a special information element associated with a respective subscriber, the information element indicating that the subscriber visits at least one particular visitor location register a plurality of times, and wherein said selecting step is performed if said available storage capacity is below said predetermined threshold value.

16. The method of claim 15, wherein said special information element associated with a respective subscriber is entered by a network operator and stored in a home location register (HLR) of the respective subscriber.

17. The method of claim 15, further comprising the steps of:
    detecting when a new subscriber enters said geographical area of said telecommunication network corresponding to said visitor location register (VLR);
    deleting the selected subscriber data from said database; and
    writing a new data set of corresponding new subscriber data into said database.

18. The method of claim 15, wherein said selection is based on the an International Mobile Subscriber Identity (IMSI) of a respective subscriber.

19. The method of claim 15, wherein said selection is additionally based on a size of a respective data set of subscriber data.

20. A home location register device for a telecommunication network, comprising:
    a memory means adapted to store a special information element associated with a respective subscriber, which special information element indicates that subscriber data of a specific subscriber are not to be deleted from the database of at least one particular visitor location register (VLR); and
    an addressing and determination means, adapted to address a data set of subscriber data in said memory means based on a request of a requesting VLR device for respective subscriber data adapted to determine that a VLR number of said requesting VLR is contained in said special information element associated with said respective subscriber, and adapted to issue an indication to the requesting VLR, indicating that subscriber data of said respective subscriber are not to be deleted from a memory means of said VLR.

21. The method of claim 20, wherein said selection is based on a Mobile Country Code (MCC) contained in an International Mobile Subscriber Identity (IMSI).

22. The method of claim 20, wherein said selection is based on a Mobile Network Code (MNC) contained in an International Mobile Subscriber Identity (IMSI).

23. The method of claim 20, wherein said selection is additionally based on a size of a respective data set of subscriber data.

24. A visitor location register device for a telecommunication network, comprising:
    a memory device for storing subscriber data in a database, the database having a predetermined storage capacity;
    a determination means for determining a roaming behavior of a subscriber having at least once registered to the visitor location register device;
    a selection means responsive to a determination made by said determination means, and adapted to select subscriber data for deletion from said memory device;
    a deletion means adapted to delete the selected subscriber data; and
    a decision means adapted to control said determination means and said deletion means based on results of monitoring said memory device,
    wherein said decision means is adapted to monitor an available storage capacity of said predetermined storage capacity of said database, to decide whether said predetermined storage capacity is below a predetermined threshold value of available storage capacity, and to select subscriber data for deletion from the memory device if said predetermined storage capacity of said database is below said predetermined threshold value, and
    wherein said selection is based on a frequency of presence of a respective subscriber within said geographical area of said telecommunication network corresponding to said visitor location register (VLR) determined by the determination means.

25. A visitor location register device for a telecommunication network, comprising:
    a memory device for storing subscriber data in a database, the database having a predetermined storage capacity;
    a determination means for determining a roaming behavior of a subscriber having at least once registered to the visitor location register device;
    a selection means responsive to a determination made by said determination means, and adapted to select subscriber data for deletion from said memory device;
    a deletion means adapted to delete the selected subscriber data, and
    a decision means adapted to control said determination means and said deletion means, based on results of monitoring said memory device,
    wherein said decision means is adapted to monitor an available storage capacity of said predetermined storage capacity of said database, to decide whether said available storage capacity is below a predetermined threshold value of available storage capacity, and to select subscriber data for deletion from the memory device if said available storage capacity is below said predetermined threshold value, and
    wherein said selection is based on a special information element associated with a respective subscriber and determined by the determination means, the information element indicating that the subscriber visits at least one particular visitor location register a plurality of times.

* * * * *